Oct. 10, 1939.  W. C. BRUCKMAN  2,175,872
HEAT SHIELD FOR OVENS
Filed Jan. 16, 1937
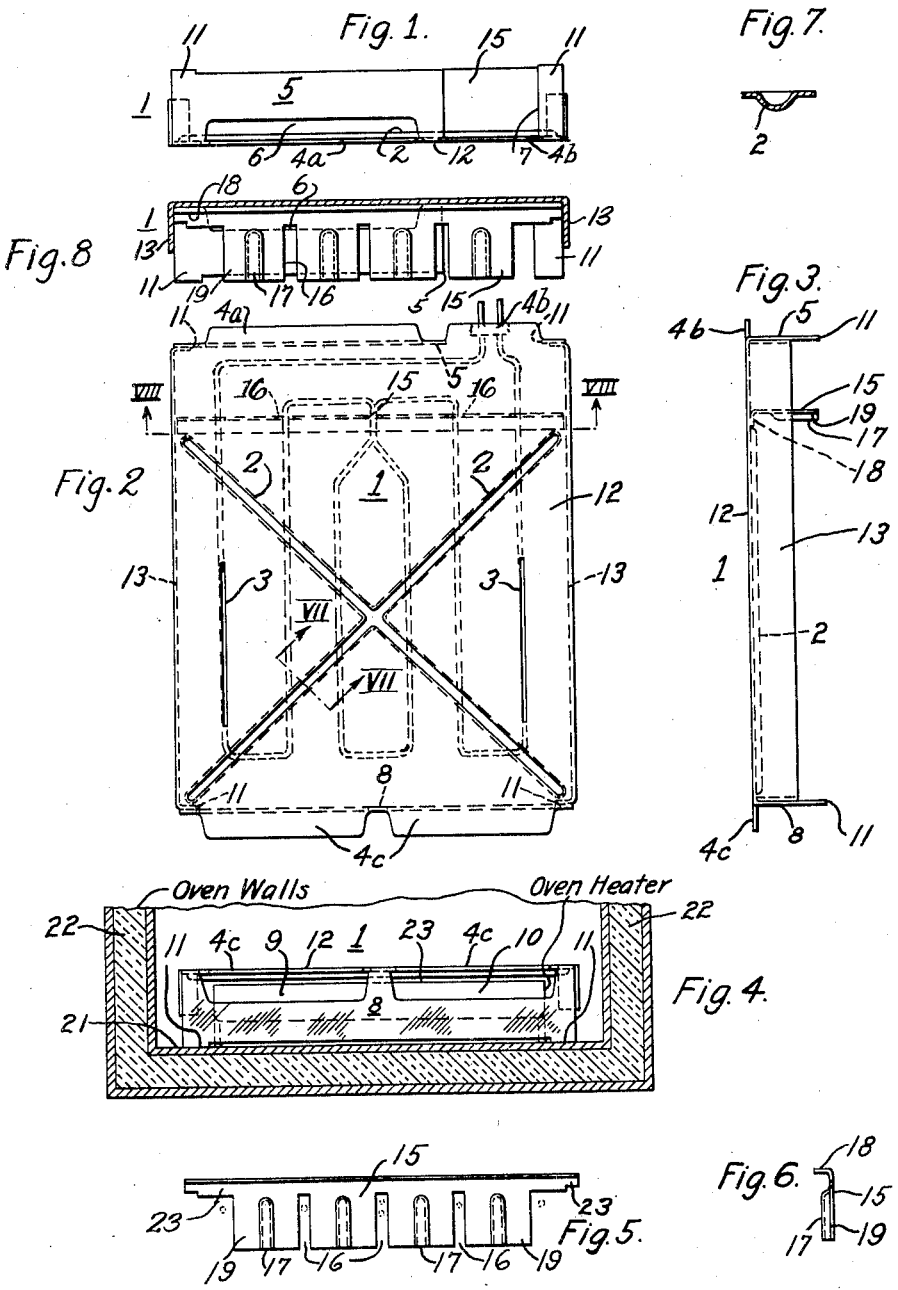
WITNESSES:
Wm. B. Sellers.
H. E. Hepler.
INVENTOR
William C. Bruckman.
BY
W. R. Coley
ATTORNEY Patented Oct. 10, 1939

2,175,872

UNITED STATES PATENT OFFICE 2,175,872

HEAT SHIELD FOR OVENS

William C. Bruckman, Mansfield, Ohio, assignor to Westinghouse Electric & Manufacturing Company, East Pittsburgh, Pa., a corporation of Pennsylvania Application January 16, 1937, Serial No. 120,921

7 Claims. (Cl. 126—22)

My invention relates to heat shields and more particularly to heat shields placed in ovens to direct the flow of heat from the heat source.

With the increasing demand for higher wattages in the bottom heater of electric ranges, it has become necessary to have a more accurate and positive control of convection from the heater than is possible with the heat shields now known to the art. It is, therefore, an object of my invention to provide a heat shield whereby the heat convected from the heating element of an oven may be accurately and positively controlled.

A further object of my invention is to provide means whereby the contents of the oven will be shielded from the direct radiation of the bottom heater.

A further object of my invention is to provide a heat shield which will prevent unsatisfactory circulation of heat when the oven is not level.

A further object of my invention is to provide a heat shield which will prohibit the reversal of circulation of heat when the oven door is cooler than the oven walls, due to the oven door having been opened.

Other objects of my invention will either be pointed out specifically in the course of the following description of a device embodying my invention or will be apparent from such description.

In the accompanying sheet of drawings:

Figure 1 is a rear elevational view of a device embodying my invention,

Fig. 2 and Fig. 3 are, respectively, a top plan view and a side elevational view of the shielding device, Fig. 4 is a front elevational view of the device shown in Fig. 1 and Fig. 2 as it is located within the oven and over the oven heater, Fig. 5 is an elevational view of a partition used in said device, Fig. 6 is an end elevational view of the partition shown in Fig. 5, Fig. 7 is an enlarged partial sectional view taken along the line VII—VII of Fig. 2, and Fig. 8 is a transverse sectional view taken along the line VIII—VIII of Fig. 2.

Referring to the drawing, I show an oven 22, an oven heat shield 1 which comprises a top surface portion 12, a plurality of wings 4a, 4b and 4c, a partition 15 and a plurality of depending side portions 5, 8 and 13. A plurality of slots 3 may be located in the top surface 12. A series of embossed ridges 2 may be placed upon the surface portion 12 to mechanically reenforce such surface.

The depending portion 5 has an aperture 6 directly under the wing 4a, and an opening 7 which is directly under wing 4b. The opening 7 proceeds from the portion 12 to the bottom in contrast to the aperture 6 which is approximately the same shape as the wing 4a.

The depending portion 8 has two apertures therein directly below the wings 4c. These apertures 9 and 10 begin at the main surface portion 12 and proceed downwardly a distance approximately equal to the length of the wings 4c. It is therefore, obvious that the surface 12 and the depending portions 5 and 8 may be of one continuous sheet of material, the depending portions merely being punched and pressed so as to leave the wings 4a, 4b and 4c parallel with the surface 12 and the main portion of said depending portions substantially at right angles to said surface.

The depending portions 13 are merely solid strips of material which proceed from the main surface portion 12 to a point substantially two-thirds the distance between such surface and the bottom of the oven. These depending portions may be separate pieces though it is preferred that they be an integral part of the main surface portion and be pressed at substantially right angles thereto.

The protruding end portions 11 of the downwardly depending portions 5 and 8 may be used as supports for the heat shield 1 which is shown in its normal position in Fig. 4. These supports may rest directly on the bottom 21 of the oven 22 and it is preferred that they rest within grooves located within the bottom 21 so that the shield will be placed in the predetermined correct position in respect to an oven heater 23 and to prevent the shield from being accidently moved therefrom.

It is to be understood that the oven 22 and the oven heater 23 are not of my present invention and are shown merely to illustrate their relative position in respect to the oven heat shield 1, and any desired type of oven and heater will be satisfactory.

The partition 15 has a plurality of vertically embossed ribs 17, vertical slots 16, and open notched portions 23. The embossed ribs 17 are located substantially in the center of the fingers 19 to give them the necessary mechanical strength. The slots 16 may be located wherever desired so that they surround the heating element. However, the exact position thereof depends upon the longitudinal location of the partition 15 and the shape of the heater element over which the heat shield 1 is placed. The open notched portions 23 located upon the ends of the partition 15 are likewise of such a shape and size that they may readily avoid contacting the oven heater element. The partition 15 may be spot welded to the underside of said surface 12 in any position desired. However, it is preferred that the partition 15 be placed transversely and relatively near the rear of said surface 12.

In an oven utilizing my invention, the lower heating element and the slotted partition 15 are shaped and located in such a manner that the slots 16 of the partition 15 do not contact the heating element while in an operating position. The downwardly depending side portions 13 will then be a substantial distance above the floor of the oven and below the heating element while the downwardly depending portions 5 and 8 will be approximately in contact with said oven floor.

If power is applied to the heater, the air in close proximity therewith is heated and tends to rise. As the air so heated rises, it can escape only through the apertures 6, 9, and 10, the opening 7 or the slots 3. However, due to the location of partition 15 that portion of the air heated at the rear of the oven can escape only through the opening 7 and the aperture 6 while that air heated at the front of said partition can escape either through the slots 3 or the slots 9 and 10. As the air is heated and leaves the heat shield, the cooler air of the oven attempts to proceed under the shield. However, since the downwardly extending portions 5 and 8 approximately contact the floor of the oven the cooler air must enter under the downwardly extending portions 13 which are located along the side of said heat shield.

It is, therefore, obvious that by the suitable proportioning of the sizes and the shapes and location of the various apertures and slots, the amount of heat liberated at each end of the heat shield may be controlled. Likewise, by changing the angle of inclination of all or a portion of each of the wings, the direction of the heat as it leaves the heat shield may be predetermined. Also, by moving the partition 15 either forward or backward, the quantity of heat convected through the front or rear portion of the heat shield may be varied.

Due to the presence of the partition 15, which divides the area beneath the heat shield into two sections, the quantity of heat directed upwardly over the inner side of the oven door may be controlled regardless of the temperature thereof in relation to the warmer walls of the oven proper. As the heated air within the oven tends to rush towards the cooler portion such as a recently closed door, the cool air therefrom has a tendency of reversing its direction and return through the heat shield. However, as hereinbefore described, by reason of the presence of the apertures 9 and 10 being located in the upper part of the depending portion 8, the rush of cooler air is prohibited from entering the front of the heat shield but is drawn around to the side thereof and in under the depending portions 13. The greater part of this rush of air through the larger portion of the oven heater leaves the heat shield through the apertures 9 and 10 and is directed upon the cool oven door by means of wings 4c. The large quantity of this warm air quickly raises the temperature of the inner wall of the oven door to that of the oven walls whereupon the circulation of the air within the oven returns to normal.

It is, therefore, obvious that the heat shield performs a plurality of functions; namely, directs the heated air through a predetermined orbit which makes it possible to maintain the oven at an even temperature, prevents the downward rush of cool air as the oven door, which has been opened, is closed, from reversing the normal flow of heated air through the heat shield, and protects the contents of the oven from the direct radiation of the oven heater.

Various modifications may be made in the device embodying my invention without departing from the spirit and scope thereof, and I desire that only such limitations shall be placed thereon as are imposed by the prior art and the appended claims.

I claim as my invention:

1. An oven heat shield comprising a substantially horizontal surface, a plurality of depending portions at the sides and a plurality of supports at the ends, a partition dependingly mounted on said heat shield within the boundaries of said portions at the sides and intermediate said supports, at least one of said portions at the sides having an opening remote from said horizontal surface and said supports at the ends each having an opening close to said surface.

2. In combination, an oven, a heating element therefor, a heat shield to be placed over said heating element to direct the heat therefrom, said heat shield comprising a surface in a plane substantially parallel to the plane of said heating element, a plurality of supports at the ends, a plurality of side portions downturned at an angle to the plane of said surface, and a partition mounted upon the inner side of the heat shield surface, said partition having a plurality of slots therein for receiving the heating element whereby the partition will not contact the heating element after the heat shield has been placed thereupon.

3. In combination, an oven, a heating element therefor, a heat shield to be placed over said heating element to direct the heat therefrom, said heat shield comprising a surface in a plane substantially parallel to the plane of said heating element, a plurality of supports at the ends, having a plurality of apertures located therein, a plurality of side portions shorter than said supports and downturned at an angle to the plane of said surface, and a partition mounted upon the inner side of the heat shield surface, said partition having a plurality of slots therein for receiving the heating element whereby the partition will not contact the heating element after the heat shield has been placed thereupon.

4. In combination, an oven, a heating element therefor, a heat shield to be placed over said heating element to direct the heat therefrom, said heat shield comprising a surface in a plane substantially parallel to the plane of said heating element, a plurality of supports at the ends, having a plurality of apertures located therein, a plurality of side portions shorter than said supports and downturned at an angle to the plane of said surface, said surface having a plurality of apertures within and a plurality of wings protruding therefrom, a partition mounted upon the inner side of the heat shield surface, said partition having a plurality of slots therein for receiving the heating element whereby the partition will not contact the heating element after the heat shield has been placed thereupon, means comprising the wings and the apertures within the side portions for directing the heat flow, and means comprising the partition for preventing the reversal of such heat flow.

5. A heat shield comprising a substantially horizontal surface, a plurality of supports at the ends, a plurality of depending portions at the sides downturned at an angle to the plane of said surface, and a dependingly mounted partition disposed transversely to said depending portions within the boundaries thereof and intermediate said supports.

6. A heat shield comprising a substantially horizontal surface, a plurality of supports at the ends, a plurality of depending portions at the sides, said surface having a plurality of apertures within and a plurality of wings protruding therefrom, and a partition dependingly mounted below said surface within the boundaries of said depending portions at the sides and intermediate said supports and having a plurality of slots therein.

7. A heat shield comprising a substantially horizontal surface, a plurality of supports at the ends having a plurality of apertures located therein, and a plurality of depending side portions shorter than said supports, said surface having a plurality of apertures within and a plurality of wings protruding therefrom, and a partition dependingly mounted below said surface within the boundaries of said depending side portions and intermediate said supports and having a plurality of slots therein.

WM. C. BRUCKMAN.